(12) United States Patent
Zhou et al.

(10) Patent No.: US 10,999,887 B2
(45) Date of Patent: May 4, 2021

(54) DATA SENDING METHOD, DATA RECEIVING METHOD, AND DEVICE

(71) Applicant: HUAWEI TECHNOLOGIES CO., LTD., Guangdong (CN)

(72) Inventors: Kaijie Zhou, Shenzhen (CN); Tianle Deng, Shenzhen (CN); Xingxing Hu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/446,394

(22) Filed: Jun. 19, 2019

(65) Prior Publication Data

US 2019/0306916 A1 Oct. 3, 2019

Related U.S. Application Data

(63) Continuation of application No. PCT/CN2017/108883, filed on Nov. 1, 2017.

(30) Foreign Application Priority Data

Dec. 20, 2016 (CN) .......................... 201611187885.6

(51) Int. Cl.
*H04W 76/28* (2018.01)
*H04W 76/38* (2018.01)
(Continued)

(52) U.S. Cl.
CPC ........... *H04W 76/28* (2018.02); *H04W 48/08* (2013.01); *H04W 52/02* (2013.01);
(Continued)

(58) Field of Classification Search
CPC ..... H04W 76/28; H04W 52/02; H04W 48/08; H04W 76/38; H04W 52/028
See application file for complete search history.

(56) References Cited

U.S. PATENT DOCUMENTS

2010/0027492 A1* 2/2010 Asanuma .......... H04W 72/0453
370/329
2010/0074159 A1* 3/2010 Yamada .............. H04W 72/005
370/312
(Continued)

FOREIGN PATENT DOCUMENTS

CN 102308612 A 1/2012
CN 102326339 A 1/2012
(Continued)

OTHER PUBLICATIONS

Huawei, HiSilicon, UE power saving mechanism in High Frequency. 3GPP TSG-RAN2 WG2 Meeting #95bis Kaohsiung, Oct. 10-14, 2016, R2-166912, 3 pages.

*Primary Examiner* — Chi Ho A Lee
(74) *Attorney, Agent, or Firm* — Womble Bond Dickinson (US) LLP (57) ABSTRACT

Embodiments of this application provide a data sending method, a data receiving method, and a device. In the data sending method, a receive end device performs a DRX operation at a low frequency based on a DRX parameter; and receives, in a time indicated by the DRX parameter, first indication information sent by a transmit end device, where the first indication information is used to instruct the receive end device to prepare to receive data at a high frequency. In this process, the receive end device performs the DRX operation only at the low frequency, and starts beam tracking only after receiving the first indication information that instructs the receive end device to receive the data at the high frequency, to avoid unnecessary beam tracking and save power of the receive end device.

14 Claims, 4 Drawing Sheets

(51) Int. Cl.
*H04W 48/08* (2009.01)
*H04W 52/02* (2009.01)

(52) U.S. Cl.
CPC ..... *H04W 52/028* (2013.01); *H04W 52/0216* (2013.01); *H04W 76/38* (2018.02); *Y02D 30/70* (2020.08)

(56) References Cited

U.S. PATENT DOCUMENTS

| | | | |
|---|---|---|---|
| 2011/0105069 A1 | 5/2011 | Gaal et al. | |
| 2011/0279319 A1 | 11/2011 | Takano et al. | |
| 2012/0122392 A1 | 5/2012 | Morioka et al. | |
| 2014/0119255 A1* | 5/2014 | Vannithamby | H04L 5/14 370/311 |
| 2015/0045048 A1 | 2/2015 | Xu et al. | |
| 2015/0092578 A1 | 4/2015 | Ingale et al. | |
| 2015/0271729 A1* | 9/2015 | Sirotkin | H04W 36/30 370/332 |
| 2016/0021570 A1* | 1/2016 | Sirotkin | H04W 36/14 370/235 |
| 2016/0037577 A1 | 2/2016 | Kanamarlapudi et al. | |
| 2016/0095003 A1 | 3/2016 | Yu et al. | |
| 2016/0128128 A1 | 5/2016 | Ang et al. | |
| 2016/0192433 A1* | 6/2016 | Deenoo | H04W 72/046 370/329 |
| 2016/0285173 A1* | 9/2016 | Svendsen | H01Q 5/328 |
| 2017/0048775 A1* | 2/2017 | Kim | H04W 76/18 |
| 2017/0164421 A1* | 6/2017 | Marinier | H04W 72/042 |
| 2017/0317710 A1* | 11/2017 | Liu | H04B 1/0057 |
| 2018/0077723 A1* | 3/2018 | Adachi | H04W 74/02 |
| 2018/0199241 A1* | 7/2018 | Xu | H04W 4/24 |
| 2019/0313314 A1* | 10/2019 | Yang | H04W 24/08 |

FOREIGN PATENT DOCUMENTS

| | | |
|---|---|---|
| CN | 102415201 A | 4/2012 |
| CN | 105850224 A | 8/2016 |
| JP | 2015089022 A | 5/2015 |
| JP | 2016504000 A | 2/2016 |
| WO | 2016146147 A1 | 9/2016 |

\* cited by examiner

DATA SENDING METHOD, DATA RECEIVING METHOD, AND DEVICE

CROSS-REFERENCE TO RELATED APPLICATIONS

This application is a continuation of International Application No. PCT/CN2017/108883, filed on Nov. 1, 2017, which claims priority of Chinese Patent Application No. 201611187885.6, filed on Dec. 20, 2016. The disclosures of the aforementioned applications are hereby incorporated by reference in their entireties.

TECHNICAL FIELD

Embodiments of this application relate to data transmission technologies, and in particular, to a data sending method, a data receiving method, and a device.

BACKGROUND

In a 5th generation mobile communications (5G) network, data is transmitted at a high frequency. A high frequency signal has a relatively large propagation loss. Therefore, in the 5G network, beamforming (beamforming) is used during data transmission to improve signal quality. Specifically, a transmit end device and a receive end device perform beam tracking (beam tracking), so that the transmit end device finds a transmit beam with best signal quality, and the receive end finds a receive beam with best signal quality.

During high frequency signal transmission, a discontinuous reception (Discontinuous Reception) mechanism is introduced in 5G to avoid power consumption caused by continually monitoring a physical downlink control channel (PDCCH) by the receive end device. In this mechanism, the receive end device first performs the beam tracking to find the receive beam with best signal quality. Then, the receive end device monitors, in an on-duration period, the PDCCH by using the found beam, and does not monitor the PDCCH at another moment. If the receive end device receives, in the on-duration period, downlink data that is sent by the transmit end device by using a high frequency signal, the receive end device maintains an active (active) state for a period of time. After the period of time, if no downlink data is received subsequently, the receive end device re-enters a sleep (inactive) state.

In the DRX mechanism, the receive end device needs to first search for an optimal receive beam, namely, the receive beam with best signal quality. However, when there is a relatively large quantity of beams, beam tracking consumes a relatively long time, and consequently, the receive end device consumes a relatively large amount of power.

SUMMARY

Embodiments of this application provide a data sending method, a data receiving method, and a device. DRX is performed at a low frequency, and beam tracking is started based on a DRX operation performed at the low frequency, to avoid unnecessary beam tracking and save power of a receive end device.

According to a first aspect, an embodiment of this application provides a data receiving method, and the method is described from a perspective of a receive end device. In the method, the receive end device performs a DRX operation at a low frequency based on a DRX parameter, and receives, in a time indicated by the DRX parameter, first indication information sent by a transmit end device, where the first indication information is used to instruct the receive end device to prepare to receive data at a high frequency.

In the method, the receive end device performs the DRX operation at the low frequency, and starts beam tracking only after receiving the first indication information that instructs the receive end device to receive the data at the high frequency, to avoid unnecessary beam tracking and save power of the receive end device.

In one embodiment, after receiving, in the time indicated by the DRX parameter, the first indication information sent by the transmit end device by using a first frequency, the receive end device further starts beam tracking to determine an optimal beam. After determining the optimal beam, the receive end device sends, to the transmit end device, second indication information that indicates the optimal beam, so that the receive end device receives, at a second frequency by using the optimal beam, data sent by the transmit end device at the second frequency.

In the method, the receive end device performs the DRX operation only at the low frequency, and starts the beam tracking only after receiving the first indication information that instructs the receive end device to receive the data at the high frequency, to avoid unnecessary beam tracking and save power of the receive end device.

In one embodiment, before performing the DRX operation at the first frequency based on the discontinuous reception DRX parameter, the receive end device further receives, at the first frequency, the DRX parameter sent by the transmit end device. The transmit end device is a transmit end device that supports the first frequency and the second frequency.

In the method, the receive end device indicates the optimal beam to the transmit end device by using the low frequency.

In one embodiment, before performing the DRX operation at the first frequency based on the discontinuous reception DRX parameter, the receive end device further receives the DRX parameter sent by a transmit end device that supports the first frequency and does not support the second frequency.

In the method, the optimal beam is indicated to the transmit end device by using the high frequency.

In one embodiment, the DRX parameter includes at least one of an on-duration timer, a DRX inactivity timer, a DRX retransmission timer, a long DRX cycle start subframe, a short DRX cycle, or a DRX short cycle timer.

According to a second aspect, an embodiment of this application provides a data sending method, and the method is described from a perspective of a transmit end device. In the method, the transmit end device generates first indication information that is used to instruct a receive end device to receive data at a high frequency, so that in a process of performing a DRX operation at a low frequency based on a DRX parameter, the receive end device receives the first indication information in a time indicated by the DRX parameter.

In the method, the receive end device performs the DRX operation only at the low frequency, and starts beam tracking only after receiving the first indication information that instructs the receive end device to receive the data at the high frequency, to avoid unnecessary beam tracking and save power of the receive end device.

In one embodiment, after sending the first indication information to the receive end device at the first frequency, the transmit end device further receives second indication information sent by the receive end device, where the second indication information indicates an optimal beam, and the optimal beam is determined by the receive end device by starting beam tracking after receiving the first indication information; and sends data to the receive end device at the second frequency, so that the receive end device receives the data at the second frequency by using the optimal beam.

In one embodiment, before sending the first indication information to the receive end device at the first frequency, the transmit end device further sends the DRX parameter to the receive end device, where the transmit end device is a transmit end device that supports the first frequency and the second frequency.

In one embodiment, the DRX parameter includes at least one of an on-duration timer, a DRX inactivity timer, a DRX retransmission timer, a long DRX cycle start subframe, a short DRX cycle, or a DRX short cycle timer.

According to a third aspect, an embodiment of this application provides a receive end device, including:

a processing module, configured to perform a DRX operation at a first frequency based on a discontinuous reception DRX parameter; and a transceiver module, configured to receive, in a time indicated by the DRX parameter, first indication information sent by a transmit end device by using the first frequency, where the first indication information instructs the receive end device to receive data at a second frequency.

In one embodiment, after the first indication information sent by the transmit end device by using the first frequency is received in the time indicated by the DRX parameter, the processing module is further configured to start beam tracking to determine an optimal beam; and the transceiver module is further configured to: send second indication information to the transmit end device, where the second indication information indicates the optimal beam; and receive, at the second frequency by using the optimal beam, data sent by the transmit end device at the second frequency.

In one embodiment, before the processing module performs the DRX operation at the first frequency based on the discontinuous reception DRX parameter, the transceiver module is further configured to receive, at the first frequency, the DRX parameter sent by the transmit end device, where the transmit end device is a transmit end device that supports the first frequency and the second frequency.

In one embodiment, before the processing module performs the DRX operation at the first frequency based on the discontinuous reception DRX parameter, the transceiver module is further configured to receive the DRX parameter sent by a transmit end device that supports the first frequency and does not support the second frequency.

In one embodiment, the DRX parameter includes at least one of an on-duration timer, a DRX inactivity timer, a DRX retransmission timer, a long DRX cycle start subframe, a short DRX cycle, or a DRX short cycle timer.

According to a fourth aspect, an embodiment of this application provides a transmit end device, including:

a processing module, configured to generate first indication information; and a transceiver module, configured to send the first indication information to the receive end device at a first frequency, so that the receive end device receives the first indication information in a time indicated by a discontinuous reception DRX parameter, and the first indication information instructs the receive end device to receive data at a second frequency.

In one embodiment, after sending the first indication information to the receive end device at the first frequency, the transceiver module is further configured to: receive second indication information sent by the receive end device, where the second indication information indicates an optimal beam, and the optimal beam is determined by the receive end device by starting beam tracking after receiving the first indication information; and send data to the receive end device at the second frequency, so that the receive end device receives the data at the second frequency by using the optimal beam.

In one embodiment, before sending the first indication information to the receive end device at the first frequency, the transceiver module is further configured to send the DRX parameter to the receive end device, where the transmit end device is a transmit end device that supports the first frequency and the second frequency.

In one embodiment, the DRX parameter includes at least one of an on-duration timer, a DRX inactivity timer, a DRX retransmission timer, a long DRX cycle start subframe, a short DRX cycle, or a DRX short cycle timer.

According to a fifth aspect, an embodiment of this application provides a receive end device, including a processor, a memory, a communications interface, and a system bus, where the memory, the communications interface, and the processor are connected to and communicate with each other by using the system bus, the memory is configured to store a computer-executable instruction, the communications interface is configured to communicate with another device, and the processor is configured to run the computer-executable instruction, so that the receive end device performs operations of the foregoing method that is applied to the receive end device.

According to a sixth aspect, an embodiment of this application provides a transmit end device, including a processor, a memory, a communications interface, and a system bus, where the memory, the communications interface, and the processor are connected to and communicate with each other by using the system bus, the memory is configured to store a computer-executable instruction, the communications interface is configured to communicate with another device, and the processor is configured to run the computer-executable instruction, so that the transmit end device performs operations of the foregoing method that is applied to the transmit end device.

According to a seventh aspect, an embodiment of this application provides a computer storage medium, configured to store a computer software instruction used by the foregoing receive end device, where the computer software instruction includes a program designed for performing the first aspect or all the feasible implementations of the first aspect.

According to an eighth aspect, an embodiment of this application provides a computer storage medium, configured to store a computer software instruction used by the foregoing transmit end device, where the computer software instruction includes a program designed for performing the second aspect or all the feasible implementations of the second aspect.

According to a ninth aspect, an embodiment of this application provides a chip system, including at least one processor, a memory, an input/output part, and a bus, where the at least one processor obtains an instruction in the memory by using the bus, to implement a designed function of the receive end device in the foregoing methods.

According to a tenth aspect, an embodiment of this application provides a chip system, including at least one processor, a memory, an input/output part, and a bus, where the at least one processor obtains an instruction in the memory by using the bus, to implement a designed function of the transmit end device in the foregoing methods.

The embodiments of this application provide a data sending method, a data receiving method, and a device. In the data sending method, the receive end device performs the DRX operation at the low frequency based on the DRX parameter, and receives, in the time indicated by the DRX parameter, the first indication information sent by the transmit end device. The first indication information is used to instruct the receive end device to prepare to receive the data at the high frequency. In the process, the receive end device performs the DRX operation only at the low frequency, and starts the beam tracking only after receiving the first indication information that instructs the receive end device to receive the data at the high frequency, to avoid unnecessary beam tracking and save power of the receive end device.

DESCRIPTION OF EMBODIMENTS

Currently, beamforming and a DRX mechanism are jointly used when data is transmitted by using a high frequency. Beamforming is used to improve signal quality, and DRX mechanism is used to reduce power consumption caused by continually monitoring a PDCCH by a receive end device. When beamforming and the DRX mechanism are jointly used, the receive end device needs to first search for an optimal receive beam, namely, a receive beam with best signal quality, and monitor the PDCCH in an on-duration period of the DRX by using the receive beam.

In the foregoing process, the receive end device needs to first search for the optimal receive beam. However, when there is a relatively large quantity of beams, beam tracking consumes a relatively long time, and consequently, the receive end device consumes a relatively large amount of power. In addition, if the receive end device receives no data in an active state indicated by the DRX, power consumed by beam tracking by the receive end device is all wasted.

In view of this, the embodiments of this application provide a data receiving method and a device. DRX is performed at a low frequency, and beam tracking is started based on a DRX operation performed at the low frequency, to avoid unnecessary beam tracking and save power of a receive end device.

Technologies described in this specification may be applied to various communications systems in which there are a plurality of types of terminals, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an orthogonal frequency division multiple access (OFDMA) system, a single-carrier FDMA (SC-FDMA) system, a general packet radio service (GPRS) system, a Long Term Evolution (LTE) system, an E-UTRA system, a 5G mobile communications system, and another communications system of this type.

A receive end device and a transmit end device in the embodiments of this application are relative. For example, during downlink data transmission, the transmit end device is a network side device, and the receive end device is user equipment. For another example, during uplink data transmission, the transmit end device is user equipment, and the receive end device is a network side device. For still another example, during device-to-device (D2D) communication, both the receive end device and the transmit end device are user equipments. The network side device may be a base station, an access point (AP), or the like. The base station may be a device that communicates with a wireless terminal over an air interface in an access network by using one or more sectors. The base station may be configured to: mutually convert a received over-the-air frame and IP packet, and serve as a router between the wireless terminal and a remaining part of the access network. The remaining part of the access network may include an Internet Protocol (IP) network. The base station may coordinate attribute management of the air interface. For example, the base station may be a base transceiver station (BTS) in GSM or CDMA, a NodeB (NodeB) in WCDMA, or an evolved NodeB (NodeB, eNB, or e-NodeB, evolutional NodeB) in LTE, or a gNB in 5G; and is not limited in this application. The user equipment may be a wired terminal or a wireless terminal. The wireless terminal may be a device that provides a user with voice and/or data connectivity, a handheld device with a radio connection function, or another processing device connected to a wireless modem. The wireless terminal may communicate with one or more core networks through a radio access network (for example, RAN, Radio Access Network, 5G RAN, non-3GPP RAN). The wireless terminal may be a mobile terminal, for example, a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, a user device, or user equipment.

In the embodiments of this application, a first frequency is a low frequency, and the second frequency is a high frequency. In other words, the second frequency is higher than the first frequency. Usually, a frequency band less than 6 GHz is a low frequency band, and a frequency band greater than 6 GHz is a high frequency band.

Figure 1A:
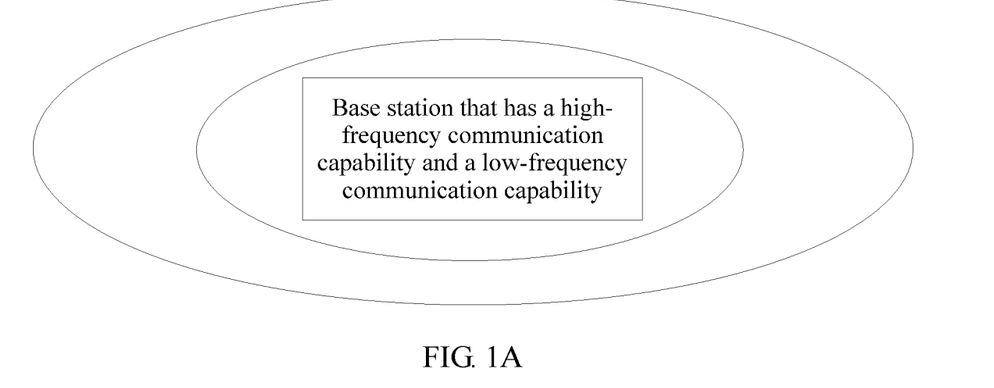
FIG. 1A is a schematic diagram of a system architecture to which a data receiving method is applicable according to an embodiment of this application.
Figure 1B:
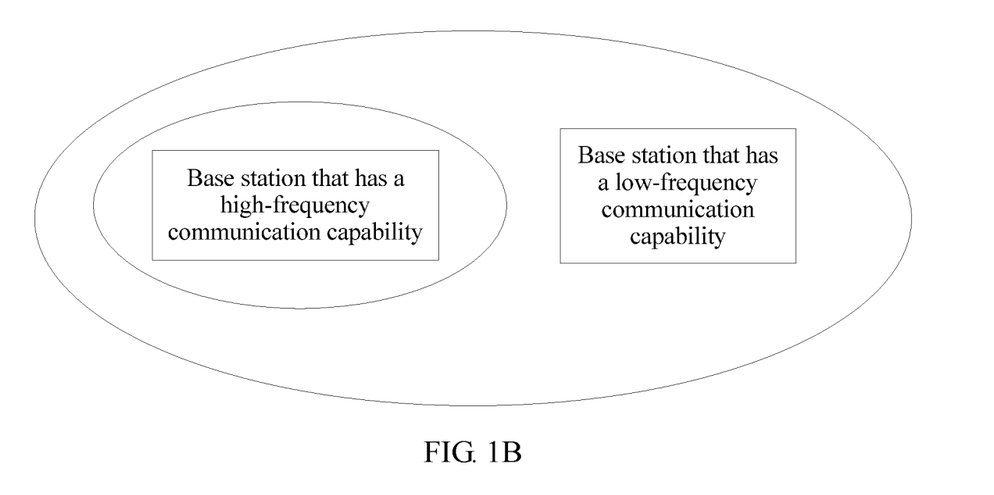
FIG. 1B is a schematic diagram of another system architecture to which a data receiving method is applicable according to an embodiment of this application.

FIG. 1A is a schematic diagram of a system architecture to which a data receiving method is applicable according to an embodiment of this application. FIG. 1B is a schematic diagram of another system architecture to which a data receiving method is applicable according to an embodiment of this application. A transmit end device is specifically a base station, and a receive end device is specifically user equipment.

Referring to FIG. 1A, a high frequency and a low frequency are deployed on a same base station. The transmit end device has both a high-frequency communication capability and a low-frequency communication capability, and the receive end device also has both a high-frequency communication capability and a low-frequency communication capability.

Referring to FIG. 1B, a high frequency and a low frequency are deployed on different base stations. To be specific, there are two base stations in a system. A base station has a high-frequency communication capability and does not have a low-frequency communication capability, and the other base station has a low-frequency communication capability and does not have a high-frequency communication capability. In a scenario in which the high frequency and the low frequency are deployed on different base stations, a base station that has a high-frequency communication capability may be connected to a base station that has a low-frequency communication capability through ideal backhaul or non-ideal backhaul, and the receive end device has both a high-frequency communication capability and a low-frequency communication capability. Usually, the base station that has a high-frequency communication capability and the receive end device communicate by using a high frequency, and the base station that has a low-frequency communication capability and the receive end device communicate by using a low frequency.

The data receiving method in the embodiments of this application is described in detail based on FIG. 1A and FIG. 1B. For details, refer to FIG. 2.

Figure 2:
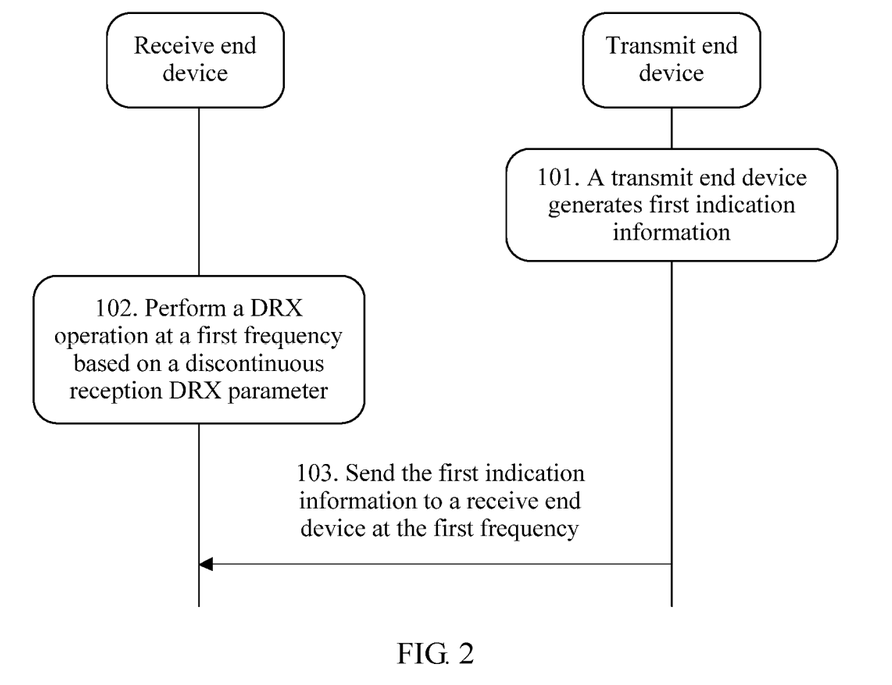
FIG. 2 is a signaling diagram of a data receiving method according to an embodiment of this application.

FIG. 2 is a signaling diagram of a data receiving method according to an embodiment of this application. The following operations are included.

Operation 101. A transmit end device generates first indication information.

In this operation, the transmit end device generates the first indication information that instructs a receive end device to receive data at a high frequency.

In an example, the transmit end device may send the first indication information to the receive end device by adding the first indication information to downlink control information (DCI) of a PDCCH.

In another example, the transmit end device may send the first indication information to the receive end device by adding the first indication information to a Media Access Control (MAC) control element (CE).

In addition, the transmit end device may further send the first indication information to the receive end device in another manner. This is not limited in this embodiment of this application.

Operation 102. A receive end device performs a DRX operation at a first frequency based on a discontinuous reception DRX parameter.

In this embodiment of this application, the receive end device is a device that has both a low-frequency communication capability and a high-frequency communication capability. In this operation, the receive end device performs the DRX operation at a low frequency, namely, the first frequency. The DRX parameter may be preconfigured; or may be sent by a transmit end device that has both a high-frequency communication capability and a low-frequency communication capability to the receive end device; or may be sent by a transmit end device that has only a low-frequency communication capability to the receive end device.

Operation 103. The transmit end device sends the first indication information to the receive end device at the first frequency.

In this operation, the transmit end device sends the first indication information to the receive end device at the first frequency, and correspondingly, the receive end device receives the first indication information. Because the receive end device performs the DRX operation at the first frequency based on the DRX parameter, the receive end device may receive, in a time indicated by the DRX parameter, the first indication information sent by the transmit end device by using the first frequency. The time indicated by the DRX is, for example, a running period of an on-duration timer (On Duration Timer) included in the DRX parameter.

In this embodiment of this application, the DRX parameter includes a DRX cycle, an on-duration timer (On Duration Timer), a DRX inactivity timer (Drx Inactivity Timer), a DRX retransmission timer (drx-RetransmissionTimer), a long DRX cycle start subframe (longDRX-CycleStartOffset), a short DRX cycle, a DRX short cycle timer (drxShortCycleTimer), and the like. A cycle is, for example, a long cycle or a short cycle. A length of DRX with a long cycle is denoted as a long DRX cycle, and a length of DRX with a short cycle is denoted as a short DRX cycle. The on-duration timer (On Duration Timer) indicates a time in which the receive end device keeps awake after waking up each time. The receive end device monitors the PDCCH at the first frequency in this period of time. The DRX inactivity timer (Drx Inactivity Timer) indicates a time in which the receive end device needs to keep active if the receive end device successfully monitors the PDCCH during the running period of the on-duration timer. The receive end device receives data at a second frequency in this period of time.

For example, it is assumed that in the DRX parameter, DRX is DRX with a long cycle, a cycle length is 320 ms, duration of the on-duration timer is 5 ms, and duration of the DRX inactivity timer is 10 ms. The receive end device wakes up every 320 ms, and continually monitors the PDCCH for 5 ms at the first frequency. If the receive end device receives data within 5 ms, the receive end device starts the DRX inactivity timer (10 ms). A value of the timer is decreased by 1 every 1 ms. The receive end device receives data at the second frequency in a running period of the DRX inactivity timer. The receive end device starts to sleep if the receive end device receives no data before the DRX inactivity timer becomes 0. If the receive end device receives data before the DRX inactivity timer becomes 0, the DRX inactivity timer is set to 0, and performs timing again.

According to the data receiving method provided in this embodiment of this application, the receive end device performs the DRX operation at the low frequency based on the DRX parameter, and receives, in the time indicated by the DRX parameter, the first indication information sent by the transmit end device. The first indication information is used to instruct the receive end device to prepare to receive data at the high frequency. In this process, the receive end device performs the DRX operation only at the low frequency, and starts beam tracking only after receiving the first indication information that instructs the receive end device to receive the data at the high frequency, to avoid unnecessary beam tracking and save power of the receive end device.

In one embodiment, after receiving, in the time indicated by the DRX parameter, the first indication information sent by the transmit end device by using the first frequency, the receive end device starts beam tracking to determine an optimal beam, and sends second indication information to the transmit end device. The second indication information indicates the optimal beam.

Specifically, after receiving the first indication information, the receive end device starts the beam tracking to search for the optimal beam. The optimal beam is, for example, a beam with best signal quality. After finding the optimal beam, the receive end device sends the second indication information to the transmit end device, to indicate the optimal beam to the transmit end device.

For the transmit end device, the transmit end device sends data to the receive end device at the second frequency, so that the receive end device receives the data at the second frequency by using the optimal beam.

Specifically, after receiving the second indication information that indicates the optimal beam, the transmit end device sends the data to the receive end device at the high frequency, namely, the second frequency, so that the receive end device receives, at the second frequency by using the optimal beam, the data sent by the transmit end device at the second frequency.

In one embodiment, the receive end device performs the DRX operation at the low frequency based on the DRX parameter, and receives, in the time indicated by the DRX parameter, the first indication information sent by the transmit end device. The first indication information is used to instruct the receive end device to prepare to receive the data at the high frequency. Then, the receive end device starts the beam tracking to search for the optimal beam, and then feeds back the optimal beam to the transmit end device by using the second indication information, so that the transmit end device sends the data at the high frequency after receiving the second indication information. Correspondingly, the receive end device receives the data at the high frequency by using the optimal beam. In this process, the receive end device performs the DRX operation only at the low frequency, and starts the beam tracking only after receiving an indication that instructs the receive end device to receive the data at the high frequency, to avoid unnecessary beam tracking and save power of the receive end device.

In one embodiment, when sending, to the transmit end device, the second indication information that indicates the optimal beam, the receive end device may specifically send the second indication information to the transmit end device at the first frequency, to indicate the optimal beam to the transmit end device by using the low frequency.

In one embodiment, when sending, to the transmit end device, the second indication information that indicates the optimal beam, the receive end device may specifically send the second indication information to the transmit end device at the second frequency, to indicate the optimal beam to the transmit end device by using the high frequency.

In one embodiment, when the low frequency and the high frequency are deployed on a same base station, before performing the DRX operation at the first frequency based on the DRX parameter, the receive end device further receives the DRX parameter that is sent, by using the low frequency, by the transmit end device that has both a high-frequency communication capability and a low-frequency communication capability. The transmit end device that has both a high-frequency communication capability and a low-frequency communication capability and the transmit end device that sends the first indication information are same or different devices.

In one embodiment, when the low frequency and the high frequency are deployed on different base stations, before performing the DRX operation at the first frequency based on the DRX parameter, the receive end device further receives the DRX parameter that is sent, by using the low frequency, by the transmit end device that has a low-frequency communication capability. The transmit end device that has a low-frequency communication capability and the transmit end device that sends the first indication information are different devices. The transmit end device that sends the first indication information is a device that has a high-frequency communication capability.

Figure 3:
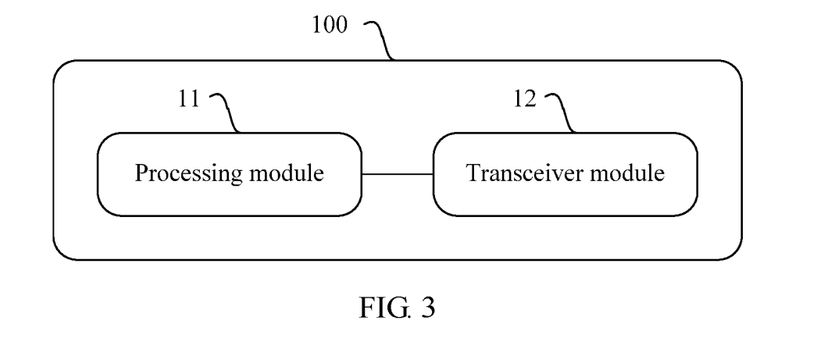
FIG. 3 is a schematic structural diagram of a receive end device according to an embodiment of this application.

FIG. 3 is a schematic structural diagram of a receive end device according to an embodiment of this application. The receive end device provided in this embodiment may implement operations of a method applied to the receive end device and provided in any embodiment of this application. Specifically, a receive end device 100 provided in this embodiment includes:

a processing module 11, configured to perform a DRX operation at a first frequency based on a discontinuous reception DRX parameter; and a transceiver module 12, configured to receive, in a time indicated by the DRX parameter, first indication information sent by a transmit end device by using the first frequency, where the first indication information instructs the receive end device to receive data at a second frequency.

The receive end device provided in this embodiment of this application performs the DRX operation at a low frequency based on the DRX parameter, and receives, in the time indicated by the DRX parameter, the first indication information sent by the transmit end device. The first indication information is used to instruct the receive end device to prepare to receive data at a high frequency. In this process, the receive end device performs the DRX operation only at the low frequency, and starts beam tracking only after receiving the first indication information that instructs the receive end device to receive the data at the high frequency, to avoid unnecessary beam tracking and save power of the receive end device.

In one embodiment, after the first indication information sent by the transmit end device by using the first frequency is received in the time indicated by the DRX parameter, the processing module 11 is further configured to start beam tracking to determine an optimal beam.

The transceiver module 12 is further configured to: send second indication information to the transmit end device, where the second indication information indicates the optimal beam; and receive, at the second frequency by using the optimal beam, data sent by the transmit end device at the second frequency.

In one embodiment, before the processing module 11 performs the DRX operation at the first frequency based on the discontinuous reception DRX parameter, the transceiver module 12 is further configured to receive, at the first frequency, the DRX parameter sent by the transmit end device. The transmit end device is a transmit end device that supports the first frequency and the second frequency.

In one embodiment, before the processing module 11 performs the DRX operation at the first frequency based on the discontinuous reception DRX parameter, the transceiver module 12 is further configured to receive the DRX parameter sent by a transmit end device that supports the first frequency and does not support the second frequency.

In one embodiment, the DRX parameter includes at least one of an on-duration timer, a DRX inactivity timer, a DRX retransmission timer, a long DRX cycle start subframe, a short DRX cycle, or a DRX short cycle timer.

Figure 4:
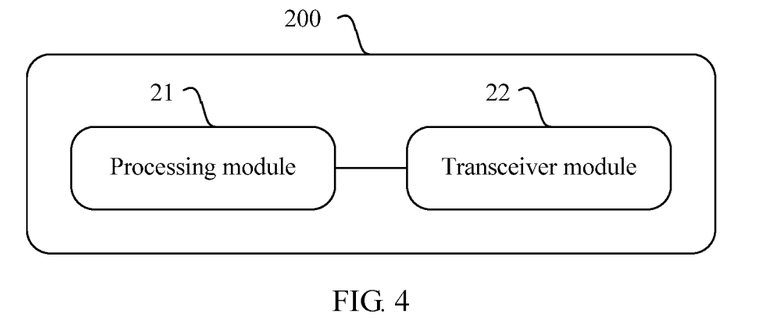
FIG. 4 is a schematic structural diagram of a transmit end device according to an embodiment of this application.

FIG. 4 is a schematic structural diagram of a transmit end device according to an embodiment of this application. The transmit end device provided in this embodiment may implement operations of a method applied to the transmit end device and provided in any embodiment of this application. Specifically, a transmit end device 200 provided in this embodiment includes:

a processing module 21, configured to generate first indication information; and a transceiver module 22, configured to send the first indication information to a receive end device at a first frequency, so that the receive end device receives the first indication information in a time indicated by a discontinuous reception DRX parameter, and the first indication information instructs the receive end device to receive data at a second frequency.

The transmit end device provided in this embodiment of this application generates the first indication information that is used to instruct the receive end device to receive data at a high frequency, so that in a process of performing a DRX operation at a low frequency based on the DRX parameter, the receive end device receives the first indication information in the time indicated by the DRX parameter. In the process, the receive end device performs the DRX operation only at the low frequency, and starts beam tracking only after receiving the first indication information that instructs the receive end device to receive the data at the high frequency, to avoid unnecessary beam tracking and save power of the receive end device.

In one embodiment, after sending the first indication information to the receive end device at the first frequency, the transceiver module 22 is further configured to: receive second indication information sent by the receive end device, where the second indication information indicates an optimal beam, and the optimal beam is determined by the receive end device by starting beam tracking after receiving the first indication information; and send data to the receive end device at the second frequency, so that the receive end device receives the data at the second frequency by using the optimal beam.

In one embodiment, before sending the first indication information to the receive end device at the first frequency, the transceiver module 22 is further configured to send the DRX parameter to the receive end device. The transmit end device is a transmit end device that supports the first frequency and the second frequency.

In one embodiment, the DRX parameter includes at least one of an on-duration timer, a DRX inactivity timer, a DRX retransmission timer, a long DRX cycle start subframe, a short DRX cycle, or a DRX short cycle timer.

Figure 5:
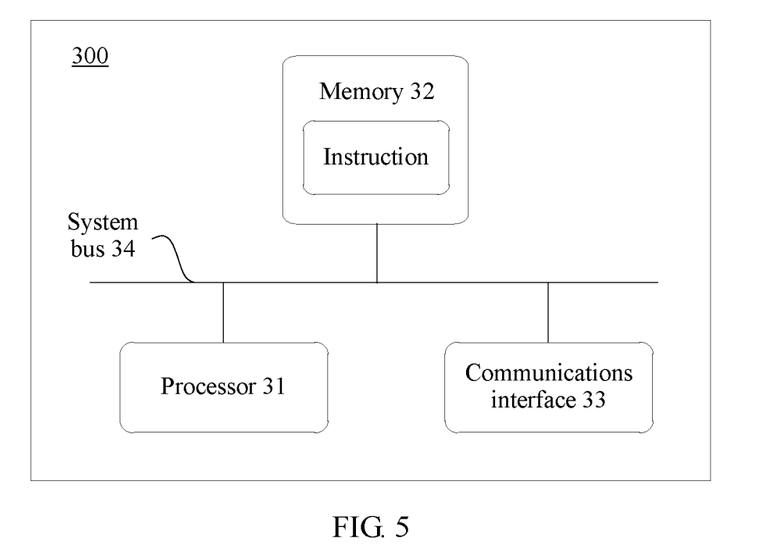
FIG. 5 is a schematic structural diagram of a receive end device according to an embodiment of this application.

FIG. 5 is a schematic structural diagram of a receive end device according to an embodiment of this application. A receive end device 300 provided in this embodiment includes a processor 31, a memory 32, a communications interface 33, and a system bus 34. The memory 32, the communications interface 33, and the processor 31 are connected to and communicate with each other by using the system bus 34. The memory 32 is configured to store a computer-executable instruction. The communications interface 33 is configured to communicate with another device. The processor 31 is configured to run the computer-executable instruction, so that the receive end device performs operations of the foregoing method applied to the receive end device.

Figure 6:
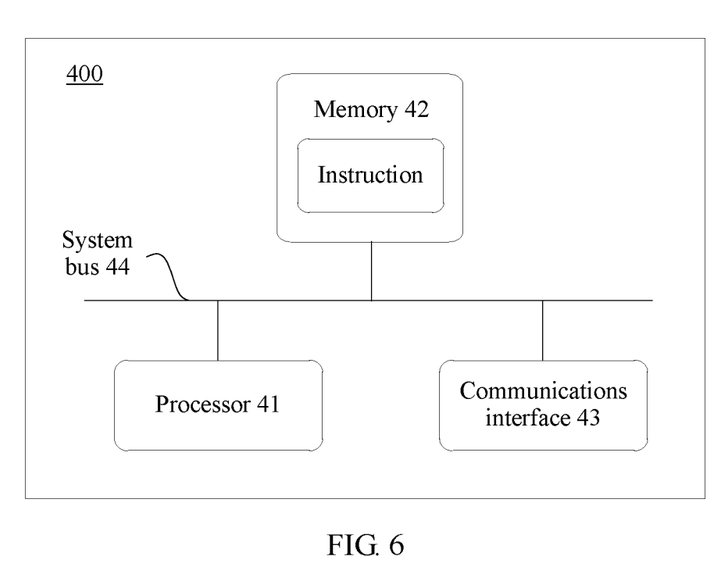
FIG. 6 is a schematic structural diagram of a transmit end device according to an embodiment of this application.

FIG. 6 is a schematic structural diagram of a transmit end device according to an embodiment of this application. A transmit end device 400 provided in this embodiment includes a processor 41, a memory 42, a communications interface 43, and a system bus 44. The memory 42, the communications interface 43, and the processor 41 are connected to and communicate with each other by using the system bus 44. The memory 42 is configured to store a computer-executable instruction. The communications interface 43 is configured to communicate with another device. The processor 41 is configured to run the computer-executable instruction, so that the transmit end device performs operations of the foregoing method applied to the transmit end device.

The system bus mentioned in FIG. 5 and FIG. 6 may be a peripheral component interconnect (PCI) bus, an extended industry standard architecture (EISA) bus, or the like. The system bus may be classified into an address bus, a data bus, a control bus, and the like. For ease of representation, the bus is represented by using only one bold line in the figure. However, it does not mean that there is only one bus or only one type of bus. The communications interface is configured to implement communication between a database access apparatus and another device (such as a client, a read/write database, or a read-only database). The memory may include a random access memory (RAM), or may be a nonvolatile memory (non-volatile memory), for example, at least one magnetic disk memory.

The processor may be a general purpose processor, including a central processing unit (CPU), a network processor (NP), or the like; or may be a digital signal processor (DSP), an application-specific integrated circuit (ASIC), a field-programmable gate array (FPGA) or another programmable logical device, a discrete gate or a transistor logical device, or a discrete hardware component.

What is claimed is:

1. A data receiving method, comprising:
performing, by a receive end device, a discontinuous reception (DRX) operation at a first frequency based on a DRX parameter;
receiving, by the receive end device in a time indicated by the DRX parameter, first indication information sent by a transmit end device by using the first frequency, wherein the first indication information instructs the receive end device to receive data at a second frequency; and
after the receiving, by the receive end device in the time indicated by the DRX parameter, the first indication information sent by the transmit end device by using the first frequency, performing operations comprising:
starting, by the receive end device, beam tracking to determine an optimal beam; sending, by the receive end device, second indication information to the transmit end device, wherein the second indication information indicates the optimal beam; and receiving, by the receive end device at the second frequency by using the optimal beam, data sent by the transmit end device at the second frequency.

2. The method according to claim 1, wherein before the performing, by a receive end device, a DRX operation at a first frequency based on a discontinuous reception DRX parameter, the method further comprises:
receiving, by the receive end device at the first frequency, the DRX parameter sent by the transmit end device, wherein the transmit end device is a transmit end device that supports the first frequency and the second frequency.

3. The method according to claim 1, wherein before the performing, by a receive end device, a DRX operation at a first frequency based on a discontinuous reception DRX parameter, the method further comprises:
receiving, by the receive end device, the DRX parameter sent by a transmit end device that supports the first frequency and does not support the second frequency.

4. The method according to claim 1, wherein the DRX parameter comprises at least one of:
an on-duration timer, a DRX inactivity timer, a DRX retransmission timer, a long DRX cycle start subframe, a short DRX cycle, and a DRX short cycle timer.

5. A data sending method, comprising:
generating, by a transmit end device, first indication information;
sending, by the transmit end device, the first indication information to a receive end device at a first frequency, so that the receive end device receives the first indication information in a time indicated by a discontinuous reception (DRX) parameter, and the first indication information instructs the receive end device to receive data at a second frequency; and
after the sending, by the transmit end device, the first indication information to the receive end device at the first frequency, performing operations further comprising: receiving, by the transmit end device, second indication information sent by the receive end device, wherein the second indication information indicates an optimal beam, and the optimal beam is determined by the receive end device by starting beam tracking after receiving the first indication information; and sending, by the transmit end device, data to the receive end device at the second frequency, so that the receive end device receives the data at the second frequency by using the optimal beam.

6. The method according to claim 5, wherein before the sending, by the transmit end device, the first indication information to the receive end device at the first frequency, the method further comprises:
sending, by the transmit end device, the DRX parameter to the receive end device, wherein the transmit end device is a transmit end device that supports the first frequency and the second frequency.

7. The method according to claim 5, wherein the DRX parameter comprises at least one of:
an on-duration timer, a DRX inactivity timer, a DRX retransmission timer, a long DRX cycle start subframe, a short DRX cycle, and a DRX short cycle timer.

8. A receive end device, comprising:
a processing module, configured to perform a discontinuous reception (DRX) operation at a first frequency based on a DRX parameter; and
a transceiver module, configured to receive, in a time indicated by the DRX parameter, first indication information sent by a transmit end device by using the first frequency, wherein the first indication information instructs the receive end device to receive data at a second frequency, wherein, after the first indication information sent by the transmit end device by using the first frequency is received in the time indicated by the DRX parameter, the processing module is further configured to start beam tracking to determine an optimal beam, and the transceiver module is further configured to: send second indication information to the transmit end device, wherein the second indication information indicates the optimal beam; and receive, at the second frequency by using the optimal beam, data sent by the transmit end device at the second frequency.

9. The receive end device according to claim 8, wherein before the processing module performs the DRX operation at the first frequency based on the DRX parameter, the transceiver module is further configured to receive, at the first frequency, the DRX parameter sent by the transmit end device, wherein the transmit end device is a transmit end device that supports the first frequency and the second frequency.

10. The receive end device according to claim 8, wherein before the processing module performs the DRX operation at the first frequency based on the discontinuous reception DRX parameter, the transceiver module is further configured to receive the DRX parameter sent by a transmit end device that supports the first frequency and does not support the second frequency.

11. The receive end device according to claim 8, wherein the DRX parameter comprises at least one of an on-duration timer, a DRX inactivity timer, a DRX retransmission timer, a long DRX cycle start subframe, a short DRX cycle, and a DRX short cycle timer.

12. A transmit end device, comprising:
a processing module, configured to generate first indication information; and
a transceiver module, configured to send the first indication information to the receive end device at a first frequency, so that the receive end device receives the first indication information in a time indicated by a discontinuous reception (DRX) parameter, and the first indication information instructs the receive end device to receive data at a second frequency, wherein, after sending the first indication information to the receive end device at the first frequency, the transceiver module is further configured to: receive second indication information sent by the receive end device, wherein the second indication information indicates an optimal beam, and the optimal beam is determined by the receive end device by starting beam tracking after receiving the first indication information; and send data to the receive end device at the second frequency, so that the receive end device receives the data at the second frequency by using the optimal beam.

13. The transmit end device according to claim 12, wherein
before sending the first indication information to the receive end device at the first frequency, the transceiver module is further configured to send the DRX parameter to the receive end device, wherein the transmit end device is a transmit end device that supports the first frequency and the second frequency.

14. The transmit end device according to claim 12, wherein the DRX parameter comprises at least one of:
an on-duration timer, a DRX inactivity timer, a DRX retransmission timer, a long DRX cycle start subframe, a short DRX cycle, and a DRX short cycle timer.

* * * * *